Dec. 11, 1962 R. LEVIEL ETAL 3,068,172

METHOD OF CLARIFYING LIQUID

Filed Oct. 12, 1960 7 Sheets-Sheet 1

Inventors
Roger Leviel
Paul Croce-Spinelli
BY Michael S. Striker
Attorney

Dec. 11, 1962 R. LEVIEL ETAL 3,068,172

METHOD OF CLARIFYING LIQUID

Filed Oct. 12, 1960 7 Sheets-Sheet 2

Inventors
Roger Leviel
Paul Croce-Spinelli
BY Michael S. Striker
Attorney

Inventors
Roger Leviel
Paul Croce-Spinelli
BY Michael S. Striker
Attorney

Inventors
Roger Leviel
Paul Croce-Spinelli
By Michael S. Striker
Attorney

Dec. 11, 1962 R. LEVIEL ETAL 3,068,172

METHOD OF CLARIFYING LIQUID

Filed Oct. 12, 1960 7 Sheets-Sheet 5

Inventors
Roger Leviel
Paul Grace-Spinelli
By Michael S. Striker
Attorney

METHOD OF CLARIFYING LIQUID

Filed Oct. 12, 1960 7 Sheets-Sheet 6

Inventors
Roger Leviel
Paul Grace-Spinelli
By Michael S. Striker
Attorney

Inventors
Roger Leviel
Paul Bruce-Spinelli
By
Michael S. Striker
Attorney 3,068,172
METHOD OF CLARIFYING LIQUID
Roger Leviel, Courbevoie, and Paul Croce-Spinelli, Paris, France, assignors to Degremont ACFI, Reuil, France
Filed Oct. 12, 1960, Ser. No. 62,269
Claims priority, application France Nov. 23, 1954
12 Claims. (Cl. 210—19)

This invention relates to improvements in the clarification of liquids, particularly water, e.g. drinking water or water for other industrial uses. More specifically the invention relates to the method of clarification which involves passing the liquid to be clarified in an upward flow through a bed of sludge adapted to collect the impurities suspended in the liquid.

The present application is a continuation-in-part application of our co-pending application Serial No. 548,-219, filed November 21, 1955, now abandoned, and entitled Clarifying Method and Apparatus.

A general method of clarifying liquids by precipitation, sedimentation and/or flocculation consists of adding to the liquid a suitable reagent adapted to form a heavy precipitate with the suspended matter that is to be removed from the liquid, and separating the resulting precipitate by sedimentation. In one well-known modification of this general method, the liquid during treatment has added to it a mass of sediment which may result from an earlier treatment step on another body of the liquid and serves to promote a rapid precipitation and sedimentation of the impurities from the fresh body of impure liquid. Such a process can be carried out in a continuous manner by passing the liquid in a continuous rising flow through a bed of sludge in which the particles suspended in the liquid are continuously agglomerated and retained while the clarified or filtered liquid is continuously withdrawn from a point above the sludge bed.

In practice extreme difficulty is encountered in maintaining a uniform rate of rising flow through the sludge bed throughout the surface thereof, chiefly for two reasons. For one thing, any non uniformity in flow velocity that may arise for some reason at some point in the bed, will not tend to diminish and die out, but will rather tend to assume greater and greater proportions, since the water will flow more easily through those areas where the sludge is less compact than elsewhere, and the increased flow velocity in such areas will tend further to decrease the capacity of the sludge therein. Thus the o-iginal flow velocity differentials tend to increase with time rather than otherwise.

Another important consideration is that the sludges of this character have considerable viscosity so that as the sludge particles settle they tend to carry with them appreciable amounts of water by viscous friction. Consequently, whenever a large sludge particle tends to settle, there will be water flowing in the same direction with it, thus producing an upwardly directed flow in the immediate surrounding vicinity, and this upward flow will add to the general flow velocity of the rising body of water and may thus impart locally thereto a value great enough to prevent the sedimentation of the lighter particles of impurity suspended in the water.

For the above explained and probably yet further reasons of related character, it has heretofore been found impractical to achieve a substantially uniform upward flow throughout the extent of the settling tank merely by feeding water thereto at a uniform rate. Since it was not possible to achieve uniform flow, it has been necessary to utilize sedimentation areas greatly in excess of those theoretically required, so that the upward flow velocity even in those privileged zones where such flow is fastest, will still be lower than the velocity required to produce an effective sedimentation of the solid particles, within a reasonably short time. Alternatively, in cases where limitations of space rather than time were predominant, the input rate of feed of water has to be made very much lower than would have been usable were the rising flow velocity the same at all points.

By way of indication, in some of the best types of sedimentation units heretofore available it was considered satisfactory by present standards to use an average upward flow velocity through the sludge bed of somewhat less than 4 meters per hour with a total settling time of about one hour, whereas the theoretical settling velocity of the particles to be separated was as high as 8 to 10 meters per hour, and the theoretical settling time as measured under optimum test conditions was of the order of only five minutes.

It is an object of this invention to provide an improved method and apparatus for clarifying liquids. Another object is to provide a clarifying method of the type using a sludge bed as described hereinabove, wherein the difficulties heretofore encountered owing to non uniform rate of flow at various points of the bed are entirely eliminated. Another object is to permit large-scale clarification or purification of water and other liquids in less time, and/or within less space, than was heretofore deemed possible for a given degree of purification. Still another object is to provide a cyclic method of the general class described, which may make use in a first stage of high flow velocities of the liquid upwardly through the sludge bed considerably higher than the settling rate of the particles to be separated, whereby a substantially uniform distribution of the sludge is provided throughout the available area, and which in a second stage provides for a slow undisturbed sedimentation under quiescent conditions. Further objects relate to the provision of automatic apparatus adapted to carry out the above specified objects in a continuous manner. Yet further objects are to provide improved methods and means for generating intermittent discharges of liquid at predetermined intervals.

Other objects and advantages of the present invention will become apparent from a further reading of the description and of the appended claims.

With the above and other objects in view, the present invention contemplates in a method of clarifying liquid containing suspended solid particles, the steps of forming a body of the liquid containing in its lower region a bed of sludge particles suspended in the liquid, in its upper region a clarification zone and substantially at its top a withdrawal zone for clarified liquid, introducing during introduction periods spaced from each other by intermittent settling periods, at the bottom of the bed of sludge liquid containing solid particles and to be clarified at a speed exceeding the precipitation rate of the sludge particles in the bed of sludge to such an extent that sludge particles of the bed of sludge will be lifted, expanding the bed of sludge in upward direction and simultaneously displacing at least part of the clarified liquid in the clarification zone into the withdrawal zone, the introduction periods being of such short length of time that the raised sludge particles will remain below the withdrawal zone for clarified liquid; and reducing during the intermittent settling periods the speed of introduction of liquid containing solid particles and to be clarified through the bottom of the bed of sludge to such an extent that the rate of upward speed of raised sludge particles in the clarification zone caused by the liquid introduced during the intermittent settling periods will be smaller than the precipitation speed of particles, causing during the intermittent settling periods downward movement of the raised particles, each of the settling periods being of at least such length that substantially all of the raised sludge particles will have settled again and the bed of sludge particles suspended in the liquid and the clarification zone consisting of substantially clarified liquid will have been re-established prior to the start of the next following introduction period.

Briefly, according to a preferred manner of carrying out the invention, the input liquid is fed intermittently into the bottom of a settling tank, capacity or chamber, preferably through inlets uniformly spaced throughout the horizontal surface area thereof, at a high rate of flow and for a relatively short period of time; thereafter the input flow is arrested and quiescent settling conditions are provided in the tank for a comparatively long period of time, and the cycle is then repeated. It is found that during the input stage of the cyclic process owing to the fact that the input rate of flow is considerably higher than the settling rate of the sludge rate of the sludge particles, all of the particles throughout the bed are placed in suspension and the bed assumes a highly uniform condition. During the ensuing quiescent stage the particles are found to settle in a perfectly uniform manner since the sedimentation process is not disturbed by the flow of liquid at this time; the conditions during this stage are substantially the same as those obtainable in a test tube and the clarification is found to proceed to completion in a minimum of time.

The rate of input flow and the duration of the input and quiescent stages should be adjusted so that during the quiescent stage the natural settling rate of the particles will have caused the bed of sludge to resume substantially the same volume as at the end of the preceding quiescent stage.

Broadly, the quiescent stage is a stage in which the input flow is either stopped completely or reduced to such an extent that the upward speed of liquid during this stage will be less than the settling rate of the sludge particles, or the direction of flow of liquid may even be reversed during the so-called quiescent stage, as will be described in detail further below.

Preferably, the initial expanded sludge bed or the bed of sludge particles suspended in the liquid which is reformed during the so-called quiescent stage, will comprise between 97% and 90% by volume of liquid and between 3% and 10% by volume of sludge particles as determined by separating liquid and sludge particles through a suction filter. In many cases best results are obtained when the bed of sludge particles suspended in the liquid will have immediately prior to the start of the next introduction period, a concentration of 95% by volume of liquid and 5% by volume of sludge particles.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which FIG. 1 is a simplified sectional elevational view of a first embodiment of an apparatus for carrying out the present method;

Figure 4:
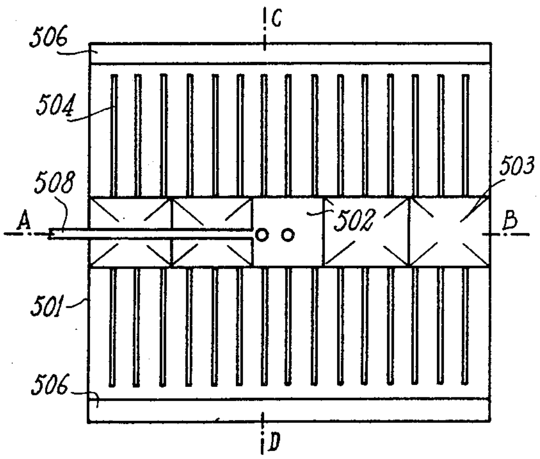
FIGS. 4–15 illustrate the arrangements used in accordance with Examples I–IV which will be described further below.
Figure 5:
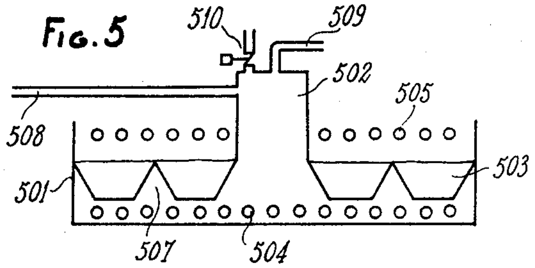
Figure 6:
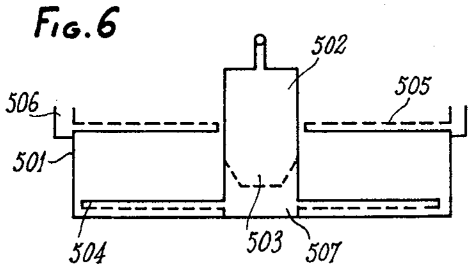
Figure 7:
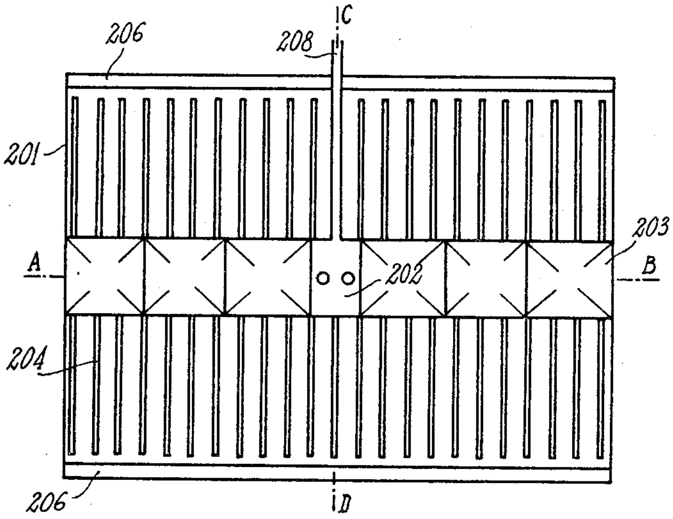
Figure 8:
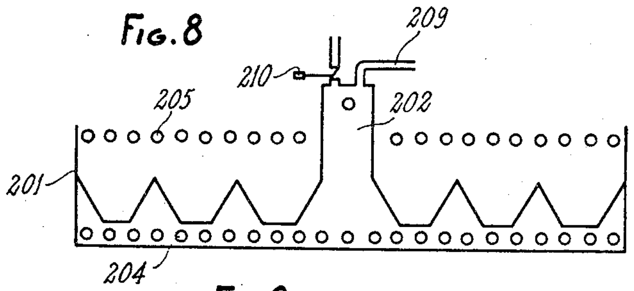
Figure 9:
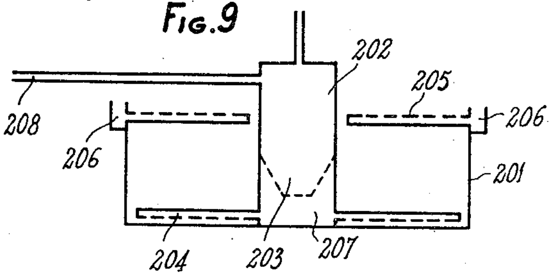
Figures 10, 11:
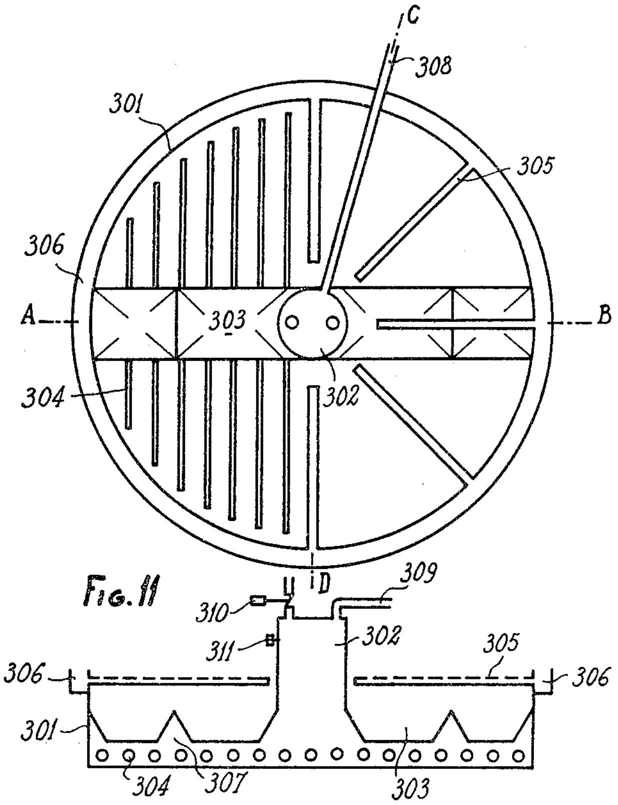
Figure 12:
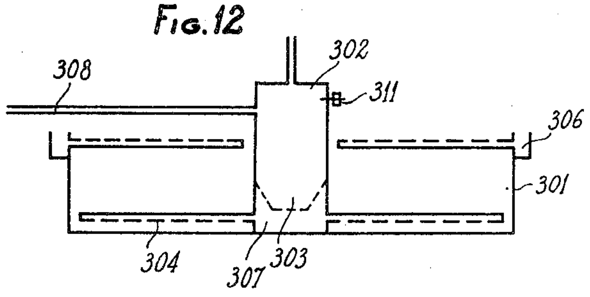
Figure 13:
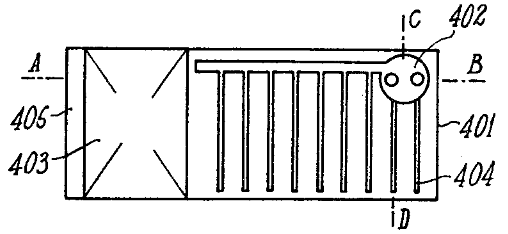
Figure 14:
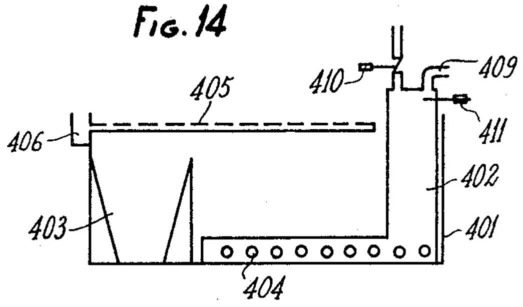
Figure 15:
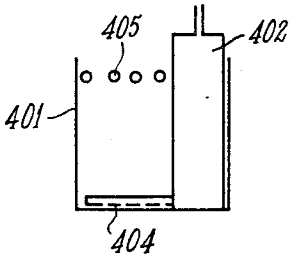

FIGS. 4–6 elate to Example I, FIG. 4 being a plan view of the device, FIG. 5 being an elevational cross-section along the line A—B of FIG. 4, and FIG. 6 being an elevational cross section along the line C—D of FIG. 4;

FIGS. 7–9 relate to Example II, FIG. 7 being a plan view of the device, FIG. 8 being an elevational cross section along the line A—B of FIG. 7, and FIG. 9 being an elevational cross section along the line C—D of FIG. 7;

FIGS. 10–12 relate to Example III, FIG. 10 being a plan view of the device, FIG. 11 being an elevational cross section along the line A—B of FIG. 10, and FIG. 12 being an elevational cross section along the line C—D of FIG. 10; and FIGS. 13–15 relate to Example IV, FIG. 13 being a plan view of the device, FIG. 14 being an elevational cross section along the line A—B of FIG. 13, and FIG. 15 being an elevational cross section along the line C—D of FIG. 13.

Figure 1:
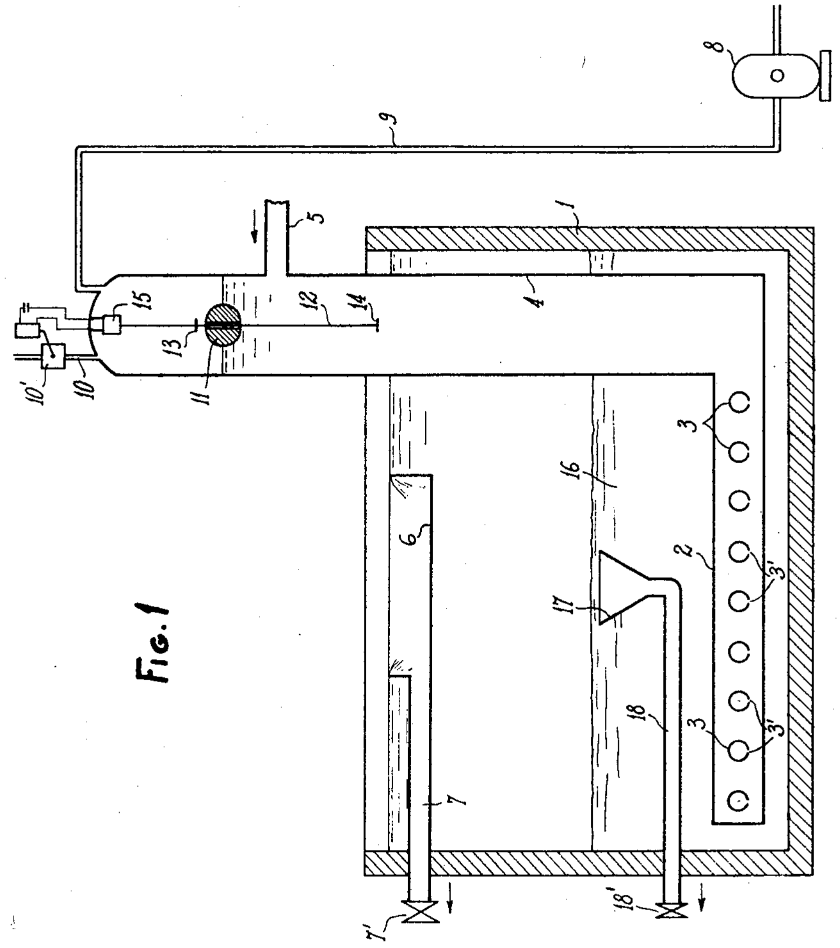

Referring now to the drawings, and particularly to FIG. 1, a tank 1 is shown, suitably built of metal or concrete material having any appropriate shape in horizontal contour, e.g. circular, square or rectangular. Extending in the bottom of the tank is a centrally located inlet manifold conduit 2 from which branch conduits 3 extend at spaced points to either side therefrom so as to reach substantially as far as both opposite sides of the tank. The branch conduits 3 have a plurality of downwardly-directed perforations 3′ formed at spaced points along their length for the introduction of the feed water into the tank.

Upstanding from an end of the manifold 2 is a riser pipe 4 sealed at its upper end, and connecting with a side of the pipe 4 at a point spaced from its upper end is a supply line 5 through which is delivered the feed water to be clarified containing any suitable precipitating or flocculating agents added thereto.

The clarified water is adapted to be collected by means of a channel 6 at the top of the tank and discharged therefrom over a discharge pipe 7 having a control valve 7′ therein.

Connecting with the top of the riser pipe 4 is a conduit 9 connected at its other end with the inlet to a suction pump 8 whereby air is adapted to be exhausted from the top of the riser pipe 4. Also connected with the top of riser pipe 4 is a vent 10 having a control valve 10′ interposed therein and adapted for automatic operation, e.g. through a solenoid connected in an electric circuit with a suitable source, as shown, and a switch 15. The switch 15 is arranged for actuation by a rod 12 which depends therefrom into the column of liquid in the riser pipe. A float member 11 is formed with an aperture surrounding the rod 12 for free sliding displacement of the float along the rod between an upper and a lower limit stop 13 and 14. The arrangement is such that when the rod 12 is raised by the float 11 being lifted into engagement with the upper stop 13, the switch 15 is operated to open the valve 10′, while on the rod 12 being lowered due to the float 13 pressing down on the lower stop 14, the switch 15 is operated to close said valve.

In normal operation the tank 1 contains a bed of sludge 16 of predetermined depth as determined by the position of a draining funnel 17 adapted to discharge the excess sludge through a drain pipe 18 and valve 18′ out of the tank.

In operation, the pump 8 is operated to draw off air and vapor from the upper part of riser pipe 4 and input water is delivered into the riser 4, at relative rates such that the liquid level will rise gradually in the pipe 4 at a predetermined velocity. Th float 11 is thus gradually raised until it engages the upper limit stop 13 and lifts the rod 12 attached thereto, actuating switch 15 to open air valve 10′. This causes an inrush of air into the top of pipe 4, resulting in a sudden discharge of water at high velocity into the tank through the conduits 2 and 3. The water from the apertures 3′ rises up through the sludge bed 16 in a plurality of points evenly distributed through-out the bed area and at a high velocity considerably greater than the settling velocity of the larger particles in the bed. The particles are thus uniformly and thoroughly placed in suspension throughout the bed. Meantime the free liquid level in the riser 4 has dropped so that the float 11 has engaged lower limit stop 14, to actuate switch 15 to close the vent valve 10'. Thus the level of liquid in pipe 4 proceeds to rise slowly again and no water is discharged through the pipes 3 into the tank, so that the sedimentation proceeds therein under quiescent conditions, until the level in riser 4 has again risen sufficiently for float 11 to actuate stop 13.

Thus during the cyclic operation of the system the sludge bed 16 is alternately lifted into a state of suspension and then allowed to settle back slowly to its original condition, in a respiratory-like motion. An intimate contact is ensured between the particles of sludge and the liquid, and the bed is maintained in an homogeneous condition at all times. The depth of the bed tends to increase slightly as from one cycle to the next owing to the additional solids separated from each successive batch of liquid, but the excess sludge will flow off through drain pipe 18 so that the actual depth of the bed is retained constant.

Figure 2:
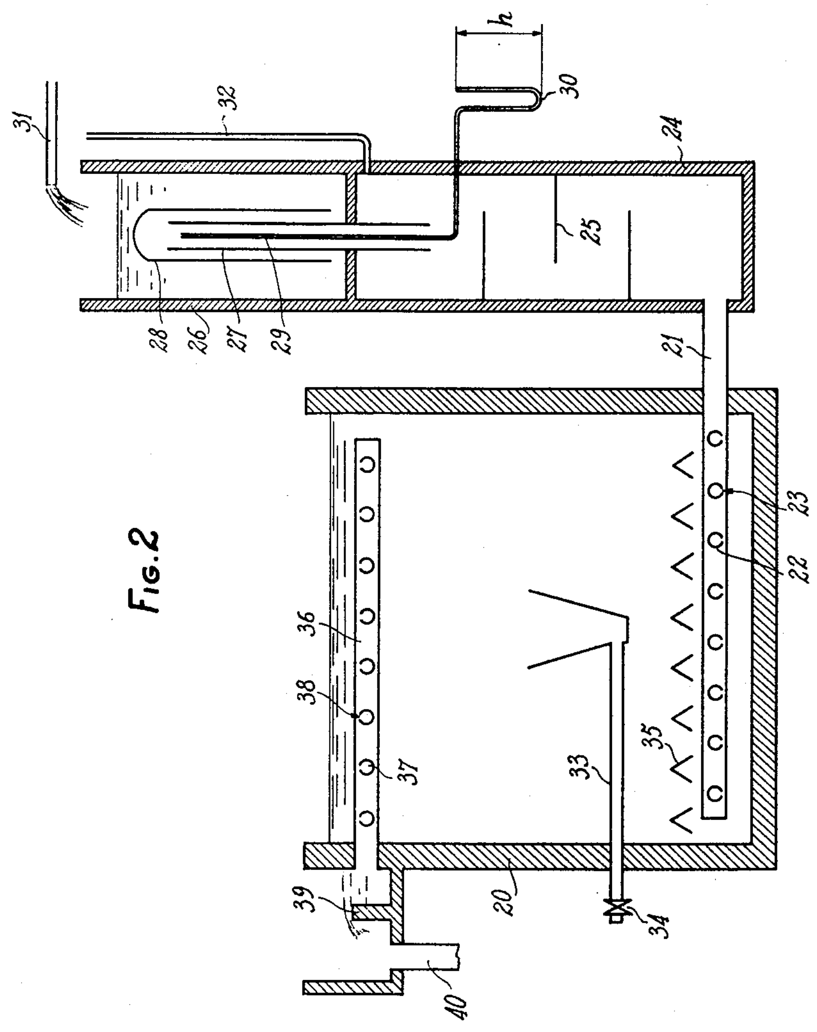
FIG. 2 is a similar showing of another embodiment of such apparatus.

In the alternative form of apparatus shown in FIG. 2, a tank 20 has an inlet manifold pipe 21 extending into it along a center line of the tank near the base thereof, and a plurality of feeder pipes 22 branch off from the pipe 21 to both sides thereof and are formed with pluralities of downwardly directed apertures 23. A bank of deflector baffles 35 in the form of roofs or inverted V's are shown as overlying the pipe 21 to minimize turbulence in the sludge bed during the water discharge stage in the cycle. Pipe 21 connects with the base of a sealed pipe 24 shown herein as provided exteriorly of the tank 20. The pipe 24 has a large cross sectional area and contains in its lower portion a plurality of baffle plates 25 for a purpose to be disclosed hereinafter. A horizontal sealing partition across the top of pipe 24 provides an upper capacity 26 open to the atmosphere at its top and located generally at an elevation higher than that of the tank 20.

The open capacity 26 communicates with the lower sealed section of pipe 24 through a vertical tube 27 which extends through an aperture in the partition forming the base of the upper capacity 26. Mounted over the tube 27 and spaced from the upper end thereof is an inverted receptacle or bell chamber 28 suitably supported in spaced relationship from the tube 27 by means not shown, and having its open lower end spaced above the base of the open capacity 26.

Extending coaxially through the tube 27 is a small diameter tube 29 which opens into the top of the tube 27 adjacent the bell somewhat below the upper end of tube 27; the opposite end of tube 29 is led out from the pipe 24. The outer end part 30 of the tube 29 is conformed to the shape of a U adapted to contain in its rising leg a predetermined head of water as indicated by $h$.

An air vent pipe 32 connects with the lower sealed section of the pipe 24 near the upper end thereof.

When the feed liquid is delivered into the top of capacity 26 through a delivery line 31, the capacity is gradually filled and the liquid level therein slowly rises. Air is entrapped in the bell chamber 28 since this air cannot escape by way of tube 29 owing to the obstacle constituted by the water head in the U-part 30 of tube 29. Owing to this sealed body of air an airlock is created which prevents the water delivered into the upper capacity 26 from flowing by way of tube 27 into the lower section of the pipe 24. However, the rising level of liquid in chamber 26 gradually compresses the said entrapped body of air and the water head $h$ is so selected that when the level in chamber 26 has attained a point near the upper end of this chamber, the pressure exerted thereby on the sealed body of air in the bell becomes greater than the water head $h$ so that the water in the U-tube 30 is expelled through the open extremity of the U-tube. This in turn allows the air entrapped in the bell to escape through the tube 29—30 into the atmosphere and disrupts the air-lock, whereupon the water in the capacity 26 will penetrate violently into the bell chamber and thence flow by way of tube 27 into the lower sealed section 24, then on through manifold 21, feeder pipes 22 and apertures 23 into the tank 20.

As the water from capacity 26 flowed down through tube 27, some of it also penetrated into the axial tube 29 so that the U-section 30 is filled as before. At the time the water level in chamber 26 reaches a point lower than the open end of bell 28, air flows into the bell chamber and rises to the top thereof where it unprimes the siphon which was present between the outer and inner tubes 27 and 29 owing to the presence of water filling the space in the top of the bell. In other words it restores the air-lock. Thus the bell chamber again becomes filled with air and the level of water in the upper chamber rises again to repeat the cycle.

The baffles 25 serve to oppose the entrainment of air into the tank, they strip the water flowing in from the upper capacity through tube 27 from most of the air carried down with it, and this air is discharged into the atmosphere through vent pipe 32.

The sludge accumulating in the bottom of the tank 20 forms a homogeneous bed which "breathes" during the cyclic operation of the process as described in connection with the first embodiment. Excess sludge is withdrawn through pipe 33 and valve 34 to maintain a constant depth in the bed despite the addition of solids thereto from the successive batches of liquid. The deflectors 35 serve to promote quiescence in the bed despite the high rate of water delivery from apertures 23 as already stated.

The clarified water is collected at the top of the tank, e.g. by means of a collector manifold 36 provided with pipes 37 branching off from the sides thereof and having pluralities of upwardly directed apertures 38 formed at spaced points therealong, so as to collect the clear water uniformly throughout the surface of the tank. The free level of the water in the tank is for this purpose maintained somewhat above the elevation of the collector manifold so that the apertures 38 will at all times be immersed. To accomplish this, the collector manifold 36 discharges into a channel defined by an overflow weir 39 at a suitable elevation, over which the clear water is made to flow into a discharge conduit 40.

It is essential according to the present invention that the introduction of raw water into the decanter in which a column of liquid has been established consisting of a bed of sludge, a clarification zone above the bed of sludge and a withdrawal zone for clarified liquid above the clarification zone, is carried out in a pulsating or cyclical manner so that during the first of the two stages of each pulse or cycle raw liquid is introduced into the lower portion of the sludge bed in the decanter in such a manner that the upward speed of liquid in the decanter will considerably exceed the average settling rate of solid particles of said sludge bed.

Thereby, solid particles will be lifted by the upwardly flowing liquid and will pass into the clarification zone. Simultaneously, clarified liquid from the clarification zone will be further lifted so as to displace clarified liquid of the withdrawal zone. The thus displaced or upwardly lifted clarified liquid of the withdrawal zone will be withdrawn thereby in a suitable manner, for instance by overflowing into a channel provided for this purpose.

It is essential that the introduction of raw liquid and thus the upward movement of solid particles will be terminated before solid particles reach the withdrawal zone.

Upon termination of the introduction of raw liquid, the second stage of the cycle starts which consists of a change in the flow of raw liquid. During this second or settling stage, the introduction of raw liquid is either completely terminated, or reduced to such an extent that the upward speed of liquid in the decanter will be considerably smaller than the settling rate of the sludge particles. It is also possible during this second stage to reverse the flow of liquid and to withdraw liquid from the bottom area of the sludge bed. In any event, whether by reducing the upward speed of liquid, terminating the introduction of raw liquid, or reversing the direction of flow of liquid, during the second stage of the cycle, sludge particles will flow downwardly and will re-establish the initial bed or sludge, thereby clarifying the liquid in the clarification zone. This second stage of the cycle is terminated when the sludge bed which existed at the start of the first stage has been re-established. At this moment, the next pulse or cycle starts with the above-described first stage.

It bears repeating that according to the present method, raw liquid introduced during the first stage also serves, so to say, to push out clarified liquid from the withdrawal zone on the top of the liquid column in the decanter; and that the first stage, i.e., introduction of raw liquid, or at least introduction of raw liquid at a speed exceeding the average settling rate of the solid particles must terminate before solid particles reach the clarification zone on the top of the column of liquid in the decanter.

Preferably, the upward speed of liquid during the first stage is considerably greater than the average settling rate of the solid particles, and the length of the first stage is correspondingly shorter than the length of the second stage or settling period.

By way of a schematic example, if it is assumed that the settling rate or average downward speed of solid particles expressed in meters per minute equals A, and the average upward speed of liquid during the first stage equals 4A, while the introduction of raw water is stopped during the settling period, the initial sludge bed will be re-established at the end of each cycle if the total length of a cycle equals four times the length of the first stage or raw liquid introduction period.

The pulsating flow of raw liquid into the decanter may be controlled and adjusted in various ways, f.i. by allowing raw water to flow continuously into a storage container and allowing flow of raw liquid from the storage container to the decanter whenever the level of the liquid in the storage container has reached a predetermined height, the flow being interrupted when the level of the liquid has dropped to a predetermined extent.

Specific operating conditions are described hereinbelow, however, without intending to limit the present invention to the specific data given.

Referring again to an arrangement such as shown in FIG. 1, the suction pump which sucks in the air from the riser pipe is so selected that its output is equal to the maximum flow of water being treated by the apparatus.

When these two flows are equal then, when the valve which communicates with the outside atmosphere is closed, all the liquid introduced into it will not pass the apparatus will collect in the pipe 4 and it will not pass into the decantation zone.

At that particular moment, there is no flow of liquid within the decanter, and thus the sludge particles will move downwardly towards the bottom of the apparatus. The level of the bed of sludge is lowered and the same displays a tendency to occupy a smaller space.

When the level of water in the chamber actuates the higher electrode, the valve communicating with the atmosphere is opened suddenly. Air is allowed to enter through the valve at a rate, f.i., ten times as great as the output of air withdrawal of the vacuum pump.

The flow of air which penetrates into the chamber is particularly great at the moment when the valve is opened, because at that moment there exists the greatest difference between atmospheric pressure and the vacuum in the chamber. This difference in pressure is equal to the height of water in the chamber which is generally limited to a range of between 60 and 100 cm. (by the position of the higher electrode).

Thus pressure on the surface of the liquid in pipe 4 is increased suddenly from about 60 to 100 grams per one square cm., to close to atmospheric pressure and thereby liquid is forced into the decanter through the numerous openings distributed for this purpose in the bottom portion thereof.

The flow which passes at any given moment through these openings is proportionate to the square root of the difference between the two pressures or the heights of the liquid columns on both sides of the openings. This flow reaches, thus, its maximum right away. The time required to reach that maximum is only limited by the inertia of liquid mass contained in the pipe and conduits. In practice, the maximum rate of flow is reached in less than two seconds after the opening of the valve communicating with atmosphere.

From that moment on, the flow decreases rapidly for two reasons. First, because the difference in the height of the two water columns is reduced. Secondly, because the rapid lowering of the liquid level in pipe 4 acts like a plunger-piston which changes its position and increases by it the amount of air contained in the chamber. Since air penetrates less quickly, because the difference between the two pressures is smaller, a new partial vacuum is formed having a braking effect on the flow of liquid.

In practice, at least one half of the amount of water introduced during each pulsation is injected during the first quarter (25%) of time of duration of the pulsation.

This is very important because it is desirable to have a very strong action during each period of introduction in order to lift the sludge particles and even sand which may have piled up on the bottom of the decanter. This must be effected in such a manner as to prevent eddy formation capable to spread to the surface of the liquid in the decanter. When the action which creates these eddies is short-lived, they cannot spread very far, because they are absorbed rapidly by friction in contact with the main body of the liquid which at that moment is in a state of rest in the decanter. The fact that the rate of flow of the introduced liquid varies constantly prevents the eddies from being maintained and from spreading very far.

The usual conditions in practice are as follows:

The surface of one square meter of decanter may assure delivery of 3½ to 4 cubic meters of treated liquid per hour.

The surface of pipe 4 or the like is equal to about $\frac{1}{40}$ of the decantation surface.

Water rises in pipe 4 to a height of 60 to 100 cm. above the water level in the decanter.

The total duration of introduction of liquid into the decanter is from 4 to 8 seconds. One half of the water flows during less than ¼ of that time.

The injected quantity preferably corresponds to a rise in the level of water in the decanter smaller than 2.5 cm.

The total duration of the cycle is more than 20 sec.

The distributing openings in the lower part of the decanter are so calculated that they can assure an instantaneous flow per second equal to the quantity of water having in pipe 4 a height one meter and with a difference in pressures between the water levels in pipe 4 and decanter equal to a liquid column of one meter.

The openings 3′ are oriented downward toward the bottom, either vertically, or by forming an angle smaller than 45 degrees in relation to the vertical line.

The openings are at a distance from the bottom of the decanter, equal to between ⅛ or $\frac{1}{10}$ of the height thereof so that during periods of prolonged stoppage, the mud which piles up on the bottom cannot seal up (clog, choke) the openings.

The water which was decanted is withdrawn from the withdrawal zone in the upper part of the decanter through holes oriented upwards. This is important in order to prevent a suction effect, which could cause the lifting of sludge particles into the withdrawal zone.

The holes of the upper collector are so calculated that they reduce hydrostatic pressure by at least 5 cm. during the maximum inflow into the decanter. This is important in order to insure an even circulation at all points of the surface of the decanter.

The maximum upward velocity reached during introduction of raw liquid and calculated as uniformly distributed over the entire square area of the decanter may reach 1 to 1.5 cm. per second.

The maximum velocity reached by the raw liquid emanating from the distributing openings in the lower portion of the decanter is about 4 meters per second.

The chemical substances required for the flocculation and for the precipitation of impurities (contained in the liquid) are introduced either through the pipe system bringing water to pipe 4 or in pipe 4 or the like itself, or else at various points inside the decanter near the bottom thereof.

The duration and the speed of flow during each injection or introduction period can be regulated by more or less throttling the opening of pipe 4 communicating with atmosphere.

Water and sludge particles move in the same direction during introduction periods; during the intermittent settling periods the sludge particles move toward the bottom while the liquid may be at rest.

Thus, for a given apparatus, the timing of pulsations is determined by the operation of the vacuum pump and by the size of the opening in pipe 4 communicating with the outer atmosphere.

If the flow of raw water to pipe 4 or the like is reduced the flow of liquid within the decanter will be reversed during the settling periods.

In this instance, the vacuum pump will have a capacity greater than the amount of crude water which is introduced into pipe 4 and thus the amount of water required to fill pipe 4 completely during the settling period of unchanged duration will have to be supplied in part by muddy sludge containing liquid returned from the decanter to pipe 4.

For instance, assuming that the operative capacity of the vacuum pump is 25% greater than the inflow of crude water, then pipe 4 will be filled each time to 80% with crude water and to 20% with sludge containing water returning from the decanter.

By reducing the operative capacity of the vacuum pump relative to the rate of inflow of raw water into pipe 4, it will be accomplished that even during the settling periods a relatively small quantity of raw water will be introduced into the decanter, equal to the difference between the rates of flow of air and raw water.

When this difference is great, it is possible to arrange settling periods of considerable duration between successive "introduction" periods while maintaining unchanged the characteristic features described above regarding the flow and the time and periods of introducing raw water into the decanter.

In this case the apparatus will operate with an uninterrupted flow in one direction, and at certain intervals, representing the periods of introduction, with a greatly increased rate or velocity of upward flow of liquid within the decanter.

Sometimes it is desirable to reduce the consumption of electric power; if for instance a pulsation or period of introduction every 15 minutes is satisfactory, instead of every 20 seconds, then the consumption of electric power will be reduced to 1/45.

The initial construction costs are also reduced considerably, if the vacuum pump need be capable only of producing a suction flow equal to 1/50 of the flow of water.

Furthermore, turbulence is considerably reduced in this case and this will prevent breaking up of flakes of solid particles. These flakes sometimes are fragile and may be smashed by the action of a strong stream of water.

It is sufficient to so regulate the frequency of the periods of introduction that during the settling periods the initial sludge bed is restored without forming sludge piles on the bottom of the decanter.

Figure 3:
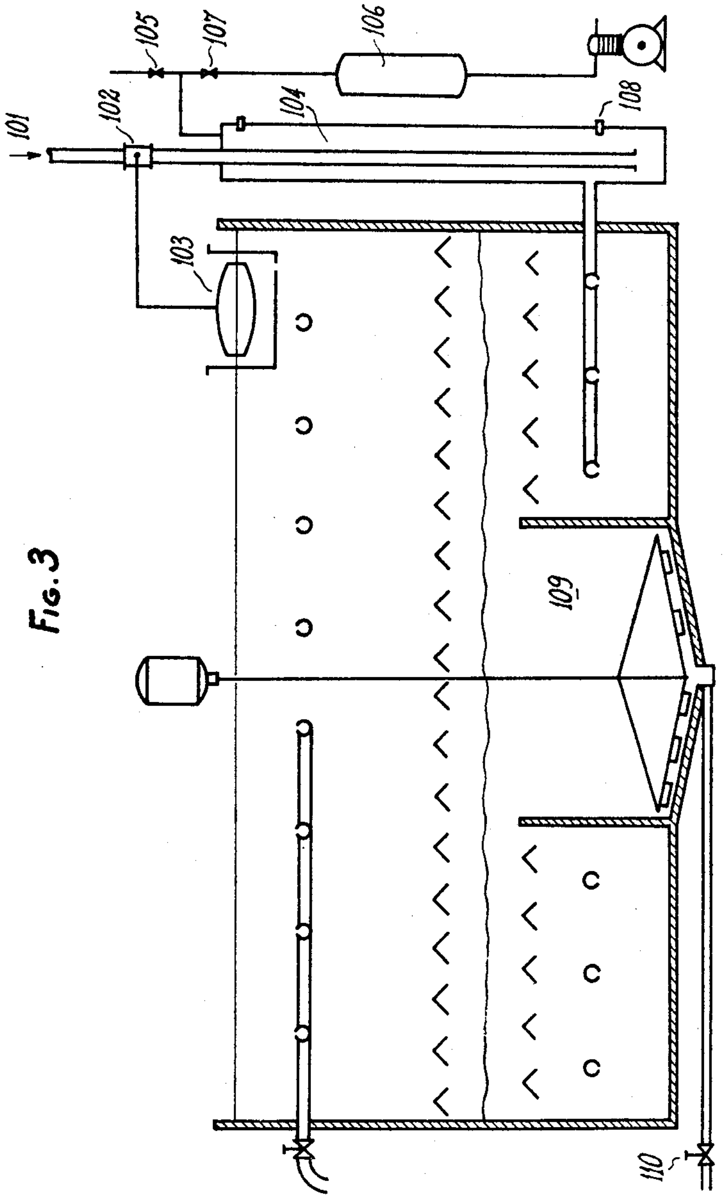
FIG. 3 illustrates in similar manner a third embodiment of an apparatus which may be utilized according to the present invention.

The introduction of raw liquid into the decanter may also be controlled by compressed air f.i. in a device such as is illustrated in FIG. 3. Crude water is introduced at 101 into the distribution chamber 104 and its flow is regulated by throttle-valve 102 controlled by float 103. The water passes into a tank or distribution chamber or pipe 4 which can communicate automatically either with the outer atmosphere through the small valve 105 or through valve 107 with the container of compressed air 106.

When the valve 107 is opened, the compressed air from container 106 expands into tank 104 and drives raw liquid from there towards the decanter. The volume of the tank 106 is small, so that the pressure of compressed air becomes very weak at the time tank 104 has been emptied. The compressed air pressure decreases, thus, in proportion as the raw liquid is introduced into the decanter, and the very rapid flow of raw liquid at the start of the introduction period is reduced progressively thereafter. This continuing reduction in the speed of flow of raw water during the introduction period will help in preventing the formation of eddies in the decanter.

An electrode 108 closes valve 107, shortly before tank 104 has been emptied in order to prevent air from entering into the decanter.

This electrode can be elimnated, if the dimensions of air-tank 106 are small or if the pressure of air in that tank is limited to a rather low value so that the quantity of air introduced into the tank 104 during each injection is insufficient to completely remove raw liquid therefrom.

The length of the entire cycle or the frequency of introduction periods is controlled by a timing mechanism with electric contacts acting on valves 105 and 107 in such a manner that at any given time one of these valves is open and the other one is closed.

Water which has been treated is taken up by a series of pipes possessing relatively small openings and situated at a distance of more than two inches below the level of the liquid.

The flow of clarified liquid through these openings is proportionate to the square root of the height of the liquid above these openings; this flow will be substantially continuous and will vary little during the periods of introduction, provided that the vertical distance between the withdrawal pipe openings and the upper level of the liquid equals at least 3 times the vertical fluctuation of the upper level of the clarified liquid during each cycle.

Float 103 is placed in a box communicating with the decanter through a small opening forming a "dash pot," so that the short fluctuations of the level during the introduction periods practically do not affect the flow of crude water which enters the tank 104.

The excess sludge which overflows into chamber 109 is evacuated through valve 110.

The following examples are given as illustrative only of the present invention without, however, limiting the invention to the specific details of the examples.

EXAMPLE I

In connection with this example, reference is made to FIGS. 4–6 of the drawing.

This example describes the operation of an installation for purification of water loaded heavily with clay; the flocculation of the suspended material is brought about by a small quantity of aluminum sulfate and lime (50 grams per cubic meter of water). The decanter is formed by a square basin 501, 15 meters on each side and 4 meters high. The basin has in its center a chamber in the form of a square bell 502 3 meters long at each side and adjacent thereto parallel to one pair of side walls of the basin a row of mud trenches 503, 3 meters wide and 2½ meters high, which row extends through the entire cross-sectional length of the decanter.

The remaining available surface for the bed of mud is therefore 15×12=180 sq. meters. Along this available surface extend pipes 504, of 250 mm. diameter, spaced one meter one from another and having 5 downwardly opening holes of 40 mm. diameter for each meter of length of the pipe.

At the level of the upper surface there are also arranged parallel pipes 505 spaced one meter one from another and having 4 upwardly opening holes of 30 mm. for each meter of length of pipes 505. Pipes 505 terminate in two outlet spouts 506.

The bottom pipes 504 are connected with the central bell 502 by means of a channel 507 located below the mud trenches.

Crude water is brought continuously into the bell at the rate of 800 cubic meters per hour via pipe 508. The air contained in the bell is sucked out through a pipe 509 by a vacuum pump having a capacity of 800 cubic meters per hour. Crude water is thus stored in the bell, since no water can flow toward the decantation zone, nor can any liquid circulate during that period.

When the level in the bell 502 has risen to 0.8 meter, the butterfly valve-gate 510, having a 250 mm. diameter, which connects the bell with the outside atmosphere, opens suddenly and the liquid moves rapidly toward the decantation zone.

Taking into consideration the dimension chosen for the holes, this outflow lasts 7 seconds, while the filling up of 7,200 liters contained in the bell, at the rate of 800 cu. meters per hour, requires 32 seconds. The velocity attained in the decantation zone during the outflow of the liquid is on an average 25 meters per hour and reaches the maximum of 50 meters per hour at the start of injection of the liquid. During the emptying of the bell, there is introduced in fact during 7 seconds the amount of water stored in the bell, i.e. 7,200 liters and, in addition, the amount of water introduced continuously into the bell at the rate of 222 liters per second, or 1,550 liters, and the combined quantity of raw water flows rapidly into the decanter during each emptying of the bell.

The maximum velocity obtained in the decanter is equal to the sum of: (*a*) the velocity obtained by the introduction of crude water, or 800 cubic meters per hour for a surface of 180 sq. meters, hence a velocity of 4.45 meters per hour; plus (*b*) the maximum velocity obtained by the emptying of the bell and which is equal to twice the average velocity corresponding to injection of 7,200 liters in 7 seconds, or a maximum flow of:

$$\frac{2\times 7200\times 3600}{7}=7400 \text{ cu. meters per hour}$$

This flow distributed on a surface of 180 sq. meters, equals a linear velocity of 41 meters per hour; thus, the maximum total velocity is:

$$41+4.45=45.45 \text{ meters per hour}$$

EXAMPLE II

This example is concerned with an installation for clarification of water of the river Seine downstream of Paris through flocculation by means of aluminum sulfate and reference is made to FIGS. 7–9. A rectangular decanter 201, 22 meters long and 15 meters wide and 5 meters deep is used for this purpose. In the center of the decanter is situated a chamber in the form of a bell 202, 3 meters by 2 meters and on both sides of it in the direction of the longer parallel sides of the apparatus are arranged mud trenches 203, 3 meters wide and 2.7 meters high. The thickness of the mud bed thus normally reaches 2.7 meters in height.

Along the available surface (260 sq. meters) on both sides of the mud trenches extend pipes 204, of 250 mm. in diameter, situated 50 cm. from the bottom, spaced one meter one from each other and perforated with 4 holes of 36 mm. diameter for each meter of pipe length.

These pipes are connected with the central bell by means of connecting pipes 207, located beneath mud trenches 203.

At the level of the water surface in the basin are situated collecting pipes 205 which collect clear, decanted water, and which have inside diameters of 150 mm. Pipes 205 are spaced one meter one from another and perforated with 3 holes of 30 mm. for each meter of length. These holes open upwardly. The pipes terminate in two outlet conduits 206.

Water to be treated is introduced continuously into the bell of the apparatus at the point 208, after a suitable dosage of aluminum sulfate has been added, at a rate of 1200 cu. meters per hour.

The air contained in the bell is sucked out at point 209, by a vacuum pump having a capacity of 600 cu. meters per hour, which causes a rise in the level of water in the bell; the amount of water in the bell, at a height of 80 cm. is 4800 liters and thus the filling up of the bell will be accomplished in 29 seconds.

During this time, there was introduced into the apparatus twice the amount of water to be treated, namely 9600 liters, out of which only one half was previously stored in the bell. The other half, or 4800 liters, has flown into the decantation zone, where it rises at a uniform speed of 2.3 meters per hour.

When the level has risen to .8 meter, butterfly valve-gate 210, of 250 mm. diameter suddenly connects the inside of the bell with the outer atmosphere, allowing liquid to flow suddenly toward the decantation zone. This outflow is completed in 5 seconds, the time being determined by the dimension of the apertures which are arranged in the distribution pipes and which allow to pass the following flow:

$$Q=K\times S\sqrt{2gh}$$

in which S represents the surface of the aperture
$h$ represents the difference in pressure between points downstream and upstream of the aperture
$g$ represents acceleration by force of gravity
$K$ represents a coefficient in the neighborhood of 0.6

Naturally, since the value of $h$ decreases constantly during the emptying of the bell, the duration of the emptying operation is determined by the integration of all the value of Q, when $h$ varies from .8 to 0 meter.

During the 5 seconds of emptying, the maximum flow of the liquid contained in the bell is equal to twice the average flow or:

$$\frac{2\times 4800\times 3600}{5}=6900 \text{ cubic meters per hour}$$

To this flow there must be added 1200 cu. meters per hour of raw water which is introduced continuously. Thus the total flow amounts to:

$$6900+1200=8100 \text{ cu. meters per hour}$$

and this amount of water is sent to the decantation zone of 260 sq. meters, attaining thus a maximum instantaneous velocity of:

$$\frac{8100}{260}=31 \text{ meters per hour.}$$

This velocity is reached approximately one second after the opening of the butterfly valve-gate, thereafter it decreases constantly and equals after 5 seconds about 2.5 meters per hour; this velocity is maintained during the subsequent filling up of the bell.

EXAMPLE III

FIG. 10 shows at the left side the arrangement of distribution pipes situated at the bottom of the apparatus, while the right side of the same view shows the collection tubes for decanted water at the top of the decanter.

The circular decanter 301 with 9 meters in diameter and 4 meters in height contains in its center a chamber in the shape of a bell 302 with 1.4 meters in diameter.

On both sides of bell 302 there are situated trenches 303 which collect mud and which occupy a width equal to the width of the bell. The total surface of the decanter is 64 sq. meters. Out of this, 12½ sq. meters are occupied by the bell and mud trenches and thus there remain 51½ sq. meters to contain the mud bed and through which the water to be treated will pass. The height of the trenches or chambers which collect mud is 2.7 meters above the bottom of the basin.

In the decantation zone there are arranged pipes 304 parallel to and spaced 0.5 meter one from each other and perforated with downwardly oriented holes. These pipes are connected with the central bell by a supply pipe 307 situated underneath the mud chambers. The diameter of pipes 304 is 125 mm. and they are perforated with 5 holes of 32 mm. per each meter of length and these holes are oriented toward the bottom of the basin.

In the upper portion of the decanter there are situated 8 pipes 305, extending in radial directions and connected with a circular outlet spout 306, which serves to withdraw decanted water. Each of these pipes is perforated with 15 upwardly opening holes of 25 mm. diameter. Water to be treated is introduced at point 308, into the bell at a constant rate of flow of 780 cu. meters per hour. This water is at the same time flocculated and softened by introduction into the bell of the apparatus of suitable dosages of ferric chloride and lime, in order to precipitate 300 mg. of solid particles per liter in the form of $CO_3Ca$. A vacuum pump allows to suck out at point 309 air contained in the bell at the rate of 350 cubic meters per hour.

The time required to raise the level of water in the bell to one meter is, therefore, 21.5 sec. and during this time the bell is filled with 1075 liters of water to be treated and in addition with 425 liters of muddy water returned from the bottom of the decantation zone.

When the level of water in the bell is raised to one meter, an electrode 311, will cause the sudden opening of butterfly valve-gate 310 having a diameter of 100 mm., and will thus connect the bell with the outer atmosphere. The liquid contianed in the bell flows out within 6 sec. toward the decantation zone. The maximum flow attained at that moment is equal to:

$$\frac{2\times 1.5\times 300}{6}+\frac{180\times 6}{3600}=1800 \text{ cu. meters per hour}$$

This flow is distributed on a surface of 51½ sq. meters and attains an instantaneous maximum velocity of:

$$\frac{1800}{51.5}=32 \text{ meters per hour}$$

This speed is attained about one second after the opening of the butterfly valve-gate, thereafter it decreases gradually and becomes zero after 5 seconds; later on, it reverses itself and becomes negative, and water circulates then from the top towards the bottom of the decanter at a velocity of 1.4 meters per hour during the subsequent filling up of the bell.

EXAMPLE IV

This example relates to a case where one tries intentionally to attain great density of mud so that it has, when it gets into contact with water to be treated, as great an adsorption capacity as possible. The device employed in this case is illustrated in FIGS. 13–15 of the drawing.

This example applies for instance to the elimination of silica contained in water by contact with precipitates of magnesium hydrate and aluminum hydrate. This is also the case when one tries to purify radioactive waters by adsorption at contact with a precipitate obtained by means of a mixture of trisodium phosphate, tannin and aluminum sulfate or ferric chloride.

Since these precipitates by their very nature are not any denser than the precipitates obtained during flocculation of natural clay-containing water for example, an increase in density of the mud within the apparatus is obtained by reducing the amount of treated water which is obtained per hour and per unit of decanter surface.

For instance, for decontamination of a radioactive water with a flow of 10 cubic meters per hour, there is chosen a rectangular decanter 401, 3 meters wide, 7 meters long and 3 meters deep.

The trench 403 for collection of excess mud occupies a length of 2 meters on the longer side of the apparatus, or a surface area of 6 square meters.

At the opposite end of the decanter is situated the bell 402, which is to bring about the pulsations of the mud bed and which is formed by a cylinder of one meter diameter. It is connected at its bottom with a system of 9 pipes 404, parallel to the smaller side of the basin, and having a diameter of 100 mm., respectively. Pipes 404 are situated 0.35 meter from the bottom of the decanter and each is perforated with 15 downwardly opening holes of 28 mm. diameter.

Air contained in the bell is sucked out at point 409, by means of a vacuum pump, at a rate of 10 cubic meters per hour until the level of water has risen to one meter.

At that moment, electrode 411 will bring about the sudden opening of butterfly valve-gate 410 of 100 mm. diameter and thereby the interior of the bell will now communicate with the outer atmosphere. Water penetrates then rapidly into the decanter at an average rate of 400 cu. meters per hour, and will reach in the decantation zone one second after the opening of the butterfly valve-gate a maximum velocity of 57 meters per hour.

The time required for emptying of the bell is 7 sec., during which there are introduced into the decanter: 800 liters representing the storage capacity of the bell, and in addition thereto the inflow of raw water during these 7 sec. The subsequent phase of the cycle, namely the filling up of the bell during which no water flows toward the decantation zone will last for 290 sec.

The relatively great length of the period during which mud can be gathered together in the liquid at standstill allows to reach heavy densities of mud; they can reach as much as 4 grams of solid matter per one liter of expanded mud in the decanter.

*Summary of Examples I–IV*

The conditions described in Examples I–IV are summarized in the following table:

| | Example I | Example II | Example III | Example IV |
|---|---|---|---|---|
| Time required for filling of bell minutes | 32 | 29 | 21.5 | 290 |
| Time required for emptying of bell do | 7 | 5 | 6 | 7 |
| Total duration of cycle do | 39 | 34 | 27.5 | 297 |
| Maximum upward velocity in decanter during introduction of raw water m./h. | 45.45 | 31 | 35 | 57 |
| Water introduction into decanter during filling of bell $m.^3/h.$ | 0 | +550 | −71 | 0 |
| Water velocity upward (+) or downward (−) in decanter during filling of bell m./h. | 0 | +2.3 | −1.4 | 0 |
| Raw water introduced per hour and square meter of decanter surface l. | 4,450 | 4,600 | 3,500 | 715 |
| Amount of water introduced into decanter during each cycle l. | 8,700 | 6,465 | 1,750 | 800 |
| Amount of water stored in bell l. | 7,200 | 4,800 | 1,500 | 780 |
| Total flow per hour $m.^3/h.$ | 800 | 1,200 | 1°0 | 10 |
| Decantation surface $m.^2$ | 180 | 260 | 51.5 | 14 |
| Decanter volume $m.^3$ | 900 | 1,600 | 250 | 63 |

Without further analysis, the foregoing will so fully reveal the gist of the present invention that others can by applying current knowledge readily adapt it for various applications without omitting features that, from from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of clarifying liquid containing suspended solid particles, the steps of forming a body of said liquid containing in its lower region a bed of sludge particles suspended in said liquid, in its upper region a clarification zone and substantially at its top a withdrawal zone for clarified liquid; introducing during introduction periods spaced from each other by intermittent settling periods and starting upon termination of the preceding intermittent settling period, at the bottom of said bed of sludge liquid containing solid particles and to be clarified at a speed exceeding the precipitation rate of the sludge particles in said bed of sludge to such an extent that sludge particles of said bed of sludge will be lifted, expanding said bed of sludge in upward direction and simultaneously displacing at least part of the clarified liquid in said clarification zone into said withdrawal zone, said introduction periods starting upon termination of the preceding intermittent settling period being of such short length of time that said raised sludge particles will remain below said withdrawal zone for clarified liquid; and reducing during said intermittent settling periods the speed of introduction of liquid containing solid particles and to be clarified through the bottom of said bed of sludge to such an extent that the rate of upward speed of raised sludge particles in said clarification zone caused by the liquid introduced during said intermittent settling periods will be smaller than the precipitation speed of said particles, causing during said intermittent settling periods downward movement of the raised particles, each of said settling periods being of such length that substantially all of said raised sludge particles will have settled again and said bed of sludge particles suspended in said liquid and said clarification zone consisting of substantially clarified liquid will have been re-established upon start of the next following introduction period.

2. In a method of clarifying liquid containing suspended solid particles, the steps of forming a body of said liquid containing in its lower region a bed of sludge particles suspended in said liquid, in its upper region a clarification zone and substantially at its top a withdrawal zone for clarified liquid; introducing during introduction periods spaced from each other by intermittent settling periods, at the bottom of said bed of sludge liquid containing solid particles and to be clarified at a speed exceeding the precipitation rate of the sludge particles in said bed of sludge to such an extent that sludge particles of said bed of sludge will be lifted, expanding said bed of sludge in upward direction and simultaneously displacing at least part of the clarified liquid in said clarification zone into said withdrawal zone, said introduction periods being of such short length of time that said raised sludge particles will remain below said withdrawal zone for clarified liquid; and withholding during said intermittent settling periods introduction of liquid containing solid particles said to be clarified through the bottom of said bed of sludge, causing during said intermittent settling periods downward movement of the raised particles, each of said settling periods being of such length that substantially all of said raised sludge particles will have settled again and said bed of sludge particles suspended in said liquid and said clarification zone consisting of substantially clarified liquid will have been re-established prior to the start of the next following introduction period.

3. In a method of clarifying liquid containing suspended solid particles, the steps of forming a body of said liquid containing in its lower region a bed of sludge particles suspended in said liquid, in its upper region a clarification zone and substantially at its top a withdrawal zone for clarified liquid; introducing during introduction periods spaced from each other by intermittent settling periods and starting upon termination of the preceding intermittent settling period, at the bottom of said bed of sludge liquid containing solid particles and to be clarified at a speed exceeding the precipitation rate of the sludge particles in said bed of sludge to such an extent that sludge particles of said bed of sludge will be lifted, expanding said bed of sludge in upward direction and simultaneously displacing at least part of the clarified liquid in said clarification zone into said withdrawal zone, said introduction periods which start, respectively, upon termination of the preceding settling period being of such short length of time that said raised sludge particles will remain below said withdrawal zone for clarified liquid; and withholding during said intermittent settling periods introduction of liquid containing solid particles and to be clarified through the bottom of said bed of sludge, causing during said intermittent settling periods downward movement of the raised particles, each of said settling periods being of at least three times the length of said introduction periods, respectively, and also of such length that substantially all of said raised sludge particles will have settled again and said bed of sludge particles suspended in said liquid and said clarification zone consisting of substantially clarified liquid will have been re-established upon to the start of the next following introduction period.

4. In a method of clarifying liquid containing suspended solid particles, the steps of forming a body of said liquid containing in its lower region a bed of sludge particles suspended in said liquid, in its upper region a clarification zone and substantially at its top a withdrawal zone for clarified liquid; introducing during introduction periods spaced from each other by intermittent settling periods, at the bottom of said bed of sludge liquid containing solid particles and to be clarified at a speed exceeding the precipitation rate of the sludge particles in said bed of sludge to such an extent that sludge particles of said bed of sludge will be lifted, expanding said bed of sludge in upward direction and simultaneously displacing at least part of the clarified liquid in said clarification zone into said withdrawal zone, said introduction periods being of such short length of time that said raised sludge particles will remain below said withdrawal zone for clarified liquid; and withholding during said intermittent settling periods introduction of liquid containing solid particles and to be clarified through the bottom of said bed of sludge, causing during said intermittent settling periods downward movement of the raised particles, each of said settling periods being of at least three times the length of said introduction periods, respectively, and also at least of such length that substantially all of said raised sludge particles will have settled again and said bed of sludge particles suspended in said liquid and said clarification zone consisting of substantially clarified liquid will have been re-established prior to the start of the next following introduction period, the combined length of an introduction period and the successive intermittent settling period being at least twenty seconds.

5. In a method of clarifying liquid containing suspended solid particles, the steps of forming a body of said liquid containing in its lower region a bed of sludge particles suspended in said liquid, in its upper region a clarification zone and substantially at its top a withdrawal zone for clarified liquid; introducing during introduction periods spaced from each other by intermittent settling periods and starting upon termination of the preceding intermittent settling period, at the bottom of said bed of sludge liquid containing solid particles and to be clarified at a speed exceeding the precipitation rate of the sludge particles in said bed of sludge to such an extent that sludge particles of said bed of sludge will be lifted, expanding said bed of sludge in upward direction and simultaneously displacing at least part of the clarified liquid in said clarification zone into said withdrawal zone, said introduction periods which start, respectively, upon termination of the preceding settling period being of such short length of time that said raised sludge particles will remain below said withdrawal zone for clarified liquid; and withholding during said intermittent settling periods introduction of liquid containing solid particles and to be clarified through the bottom of said bed of sludge, causing during said intermittent settling periods downward movement of the raised particles, each of said settling periods being of at least three times the length of said introduction periods, respectively, and also of such length that substantially all of said raised sludge particles will have settled again and said bed of sludge particles suspended in said liquid and said clarification zone consisting of substantially clarified liquid will have been re-established upon to the start of the next following introduction period, the combined length of an introduction period and the successive intermittent settling period being between about 20 and 90 seconds.

6. In a cyclical method of separating suspended sludge-forming particles from a liquid containing the same thereby clarifying the liquid, the steps of introducing into the lowermost portion of a column of liquid comprising a lower region consisting of a bed of sludge particles suspended in said liquid, an upper region forming a clarification zone containing clarified liquid and a liquid withdrawal zone above said clarification zone, during introduction periods spaced from each other by intermittent settling periods one introduction period and the successive settling period forming a cycle, raw liquid containing sludge forming solid particles and to be clarified, the speed of introduction of said raw liquid exceeding the precipitation rate of the sludge particles in said bed of sludge so as to lift said sludge particles and expanding said bed of sludge in upward direction while simultaneously moving at least part of the liquid in said clarification zone into said withdrawal zone, the upward speed of said introduced raw liquid and the length of said introduction periods, respectively, being so adjusted that said withdrawal zone will remain substantially free of sludge particles; and reducing during said intermittent settling periods the speed of introduction of raw liquid to such an extent that the average upward speed of said raw liqiud during an entire cycle will be substantially equal to the average precipitation rate of said sludge particles during such entire cycle, so as to cause during said intermittent settling periods downward movement of the raised particles so that at the end of each cycle substantially all of said raised sludge particles will have settled to such an extent as to re-establish said bed of sludge particles and said clarification zone.

7. In a cyclical method of separating suspended sludge-forming particles from a liquid containing the same thereby clarifying the liquid, the steps of introducing into the lowermost portion of a column of liquid comprising a lower region consisting of a bed of sludge particles suspended in said liquid, an upper region forming a clarification zone containing clarified liquid and a liquid withdrawal zone above said clarification zone, during introduction periods spaced from each other by intermittent settling periods and starting upon termination of the preceding intermittent settling period, one introduction period and the successive settling period forming a cycle, raw liquid containing sludge forming solid particles and to be clarified, the speed of introduction of said raw liquid exceeding the precipitation rate of the sludge particles in said bed of sludge so as to lift said sludge particles and expanding said bed of sludge in upward direction while simultaneously moving at least part of the liquid in said clarification zone into said withdrawal zone, the upward speed of said introduced raw liquid and the length of said introduction periods starting upon termination of the preceding intermittent settling period, respectively, being so adjusted that said withdrawal zone will remain substantially free of sludge particles; and reversing during said intermittent settling periods the direction of flow of raw liquid in such a manner that the average upward speed of said raw liquid during an entire cycle will be substantially equal to the average precipitation rate of said sludge particles during such entire cycle, so as to cause during said intermittent settling periods downward movement of the raised particles so that at the end of each cycle substantially all of said raised sludge particles will have settled to such an extent as to re-establish said bed of sludge particles and said clarification zone.

8. In a cyclical method of separating suspended sludge-forming particles from a liquid containing the same thereby clarifying the liquid, the steps of introducing into the lowermost portion of a column of liquid comprising a lower region consisting of a bed of sludge particles suspended in said liquid, an upper region forming a clarification zone containing clarified liquid and a liquid withdrawal zone above said clarification zone, during introduction periods spaced from each other by intermittent settling periods one introduction period and the successive settling period forming a cycle, raw liquid containing sludge forming solid particles and to be clarified, the speed of introduction of said raw liquid exceeding the precipitation rate of the sludge particles in said bed of sludge so as to lift said sludge particles and expanding said bed of sludge in upward direction while simultaneously moving at least part of the liquid in said clarification zone into said withdrawal zone, the upward speed of said introduced raw liquid and the length of said introduction periods, respectively, being so adjusted that said withdrawal zone will remain substantially free of sludge particles; and halting during said intermittent settling periods introduction of raw liquid so that the average upward speed of said raw liquid during an entire cycle will be substantially equal to the average precipitation rate of said sludge particles during such entire cycle, so as to cause during said intermittent settling periods downward movement of the raised particles and so that at the end of each cycle substantially all of said raised sludge particles will have settled to such an extent as to re-establish said bed of sludge particles and said clarification zone.

9. In a two-part cyclical method of clarifying a raw liquid containing suspended solid particles and wherein the two parts of successive cycles alternate with each other and follow each other without interruption, the steps of passing said raw liquid during the first part of each cycle, which starts upon termination of the second part of the preceding cycle, in an upward direction through a body of liquid including a clarification zone consisting of said liquid and having in the lower region thereof a horizontally extending bed of solid particles suspended in said liquid and having therein a predetermined average settling rate, said body of liquid also including a withdrawal zone above said clarification zone, the velocity of passage of said liquid in upward direction through said clarification zone being substantially greater than said predetermined average settling rate of said solid particles in said liquid, whereby formation of channels in said bed of solid particles is at least substantially avoided while said bed is lifted upwardly to expand into said clarification zone upwardly displacing at least a portion thereof and causing simultaneous withdrawal of clarified liquid from said withdrawal zone said first part of each cycle being terminated before solid particles are lifted into said withdrawal zone; and reducing the upward velocity of said raw liquid during the second part of each cycle to a value between zero and a maximum value being sufficiently smaller than the average settling rate of said solid particles so as to allow said solid particles during said second part of each cycle to reform said horizontally extending bed.

10. In a two-part cyclical method of clarifying a raw liquid containing suspended solid particles, the steps of passing said raw liquid during the first part of each cycle in an upward direction through a body of liquid including a clarification zone consisting of said liquid and having in the lower region thereof a horizontally extending bed of solid particles suspended in said liquid and having therein a predetermined average settling rate, said body of liquid also including a withdrawal zone above said clarification zone, the velocity of passage of said liquid in upward direction through said clarification zone being substantially greater than said predetermined average settling rate of said solid particles in said liquid, whereby formation of channels in said bed of solid particles is at least substantially avoided while said bed is lifted upwardly to expand into said clarification zone upwardly displacing at least a portion thereof and causing simultaneous withdrawal of clarified liquid from said withdrawal zone, said first part of each cycle being terminated before solid particles are lifted into said withdrawal zone; and reversing the direction of flow of liquid during the second part of each cycle until said solid particles have settled sufficiently to reform said horizontally extending bed whereby in a pulsating manner during the first part of each cycle clarified liquid is withdrawn from said withdrawal zone, and during the second part of each cycle said withdrawal zone consisting of clarified liquid is re-established.

11. In a method of clarifying liquid containing suspended solid particles, the steps of forming a body of said liquid containing in its lower region a bed of sludge particles suspended in said liquid, in its upper region a clarification zone and substantially at its top a withdrawal zone for clarified liquid; introducing during introduction periods spaced from each other by intermittent settling periods, at the bottom of said bed of sludge liquid containing solid particles and to be clarified at a diminishing speed exceeding throughout the entire introduction period the precipitation rate of the sludge particles in said bed of sludge to such an extent that sludge particles of said bed of sludge will be lifted, in such a manner that during the first quarter of said introduction period at least fifty percent of the solid particles containing liquid is introduction, by such introduction expanding said bed of sludge in upward direction and simultaneously displacing at least part of the clarified liquid in said clarification zone into said withdrawal zone, said introduction periods being of such short length of time that said raised sludge particles will remain below said withdrawal zone for clarified liquid; and reducing during said intermittent settling periods the speed of introduction of liquid containing solid particles and to be clarified through the bottom of said bed of sludge to such an extent that the rate of upward speed of raised sludge particles in said clarification zone caused by the liquid introduced during said intermittent settling periods will be smaller than the precipitation speed of said particles, causing during said intermittent settling periods downward movement of the raised particles, each of said settling periods being of at least such length that substantially all of said raised sludge particles will have settled again and said bed of sludge particles suspended in said liquid and said clarification zone consisting of substantially clarified liquid will have been re-established prior to the start of the next following introduction period.

12. In a continuous method of clarifying liquid containing suspended solid particles, the steps of forming a body of said liquid containing in its lower region an expanded bed of sludge particles suspended in said liquid containing between about 97% and 90% by volume of liquid and between about 3% and 10% by volume of sludge particles, in its upper region a clarification zone and substantially at its top a withdrawal zone for clarified liquid; introducing during introduction periods spaced from each other by intermittent settling periods and starting upon termination of the preceding intermittent settling period, at the bottom of said bed of sludge liquid containing solid particles and to be clarified at a speed exceeding the precipitation rate of the sludge particles in said bed of sludge to such an extent that sludge particles of said bed of sludge will be lifted, expanding said bed of sludge in upward direction and simultaneously displacing at least part of the clarified liquid in said clarification zone into said withdrawal zone, said introduction periods which start, respectively, upon termination of the preceding settling period being of such short length of time that said raised sludge particles will remain below said withdrawal zone for clarified liquid; and reducing during said intermittent settling periods the speed of introduction of liquid containing solid particles and to be clarified through the bottom of said bed of sludge to such an extent that the rate of upward speed of raised sludge particles in said clarification zone caused by the liquid introduced during said intermittent settling periods will be smaller than the precipitation speed of said particles, causing during said intermittent settling periods downward movement of the raised particles, each of said settling periods being of such length that substantially all of said raised sludge particles will have settled again and said bed of sludge particles suspended in said liquid and said clarification zone consisting of substantially clarified liquid will have been re-established upon the start of the next following introduction period.

References Cited in the file of this patent

UNITED STATES PATENTS 2,245,587 Hughes ---------------- June 17, 1941